(12) United States Patent
Ishikawa et al.

(10) Patent No.: US 10,046,759 B2
(45) Date of Patent: Aug. 14, 2018

(54) CONTROL DEVICE AND CONTROL METHOD FOR ELECTRICALLY DRIVEN VEHICLE

(71) Applicant: Mitsubishi Electric Corporation, Tokyo (JP)

(72) Inventors: Osamu Ishikawa, Tokyo (JP); Yasufumi Ogawa, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/431,839

(22) Filed: Feb. 14, 2017

(65) Prior Publication Data

US 2017/0259695 A1   Sep. 14, 2017

(30) Foreign Application Priority Data

Mar. 8, 2016   (JP) .................................. 2016-044157

(51) Int. Cl.
*B60W 20/50* (2016.01)
*B60W 50/02* (2012.01)
(Continued)

(52) U.S. Cl.
CPC .......... *B60W 20/50* (2013.01); *B60L 11/1803* (2013.01); *B60L 15/20* (2013.01);
(Continued)

(58) Field of Classification Search
CPC ...... B60W 10/30; B60W 20/50; B60W 50/02; B60W 50/0205; B60W 50/0225;
(Continued)

(56) References Cited

U.S. PATENT DOCUMENTS 8,229,616 B2 * 7/2012 Aridome et al. ..... B60W 20/50
701/22

FOREIGN PATENT DOCUMENTS

JP         08154308 A      6/1996
JP         10-210790 A     8/1998
(Continued)

OTHER PUBLICATIONS

Espacenet Translation of JP2009284597(A), Shoji, 15 pages, Dec. 3, 2009.*

(Continued)

*Primary Examiner* — Dale W Hilgendorf
(74) *Attorney, Agent, or Firm* — Sughrue Mion, PLLC; Richard C. Turner

(57) ABSTRACT

While coolant is used to cool a motor inverter and a generator inverter included in a power drive unit configured to invert power between a battery and a motor/generator in both directions, an EV travel mode and a power generation travel mode are switched according to detection values from sensors in an electrically driven vehicle and including a switching device temperature sensor for a switching device of the inverters and a coolant temperature sensor, thereby controlling the vehicle. A failure of the coolant temperature sensor is detected according to a detection value from the coolant temperature sensor, and, in the EV travel mode, a detection value detected by the switching device temperature sensor for the switching device of the generator inverter is set as a detection value of a temperature of the coolant when the failure of the coolant temperature sensor is detected.

5 Claims, 6 Drawing Sheets

(51) Int. Cl.
  *B60W 10/30* (2006.01)
  *B60W 50/029* (2012.01)
  *B60L 11/18* (2006.01)
  *B60L 15/20* (2006.01)
  *B60L 11/08* (2006.01)

(52) U.S. Cl.
  CPC ............ *B60W 10/30* (2013.01); *B60W 50/02* (2013.01); *B60W 50/0205* (2013.01); *B60W 50/029* (2013.01); *B60W 50/0225* (2013.01); *B60L 11/08* (2013.01); *B60W 2050/0215* (2013.01); *B60W 2050/0297* (2013.01); *Y02T 10/7258* (2013.01); *Y10S 903/903* (2013.01)

(58) Field of Classification Search
  CPC ....... B60W 50/029; B60W 2050/0215; B60W 2050/0297; B60L 11/1803; B60L 15/20
  See application file for complete search history.

(56) References Cited

FOREIGN PATENT DOCUMENTS

| | | | | |
|---|---|---|---|---|
| JP | 2004219324 A | 8/2004 | | |
| JP | 2004257821 A | 9/2004 | | |
| JP | 2009284597 A | * 12/2009 | ............ | B60W 20/00 |
| JP | 2009284597 A | 12/2009 | | |

OTHER PUBLICATIONS

Communication dated Feb. 21, 2017 from the Japanese Patent Office in counterpart Japanese application No. 2016-044157.

* cited by examiner

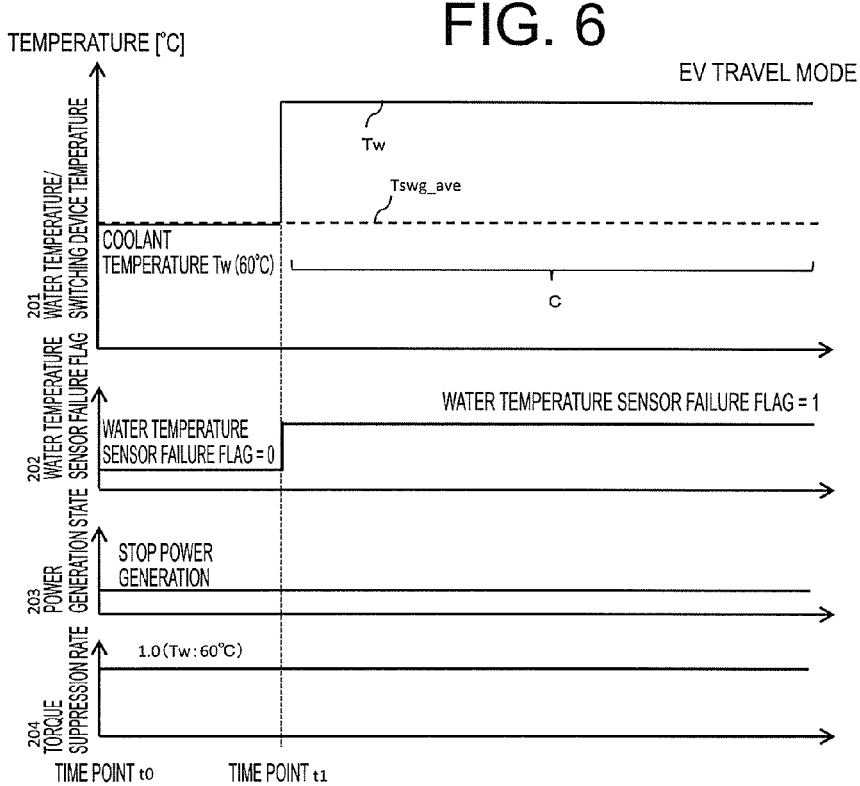
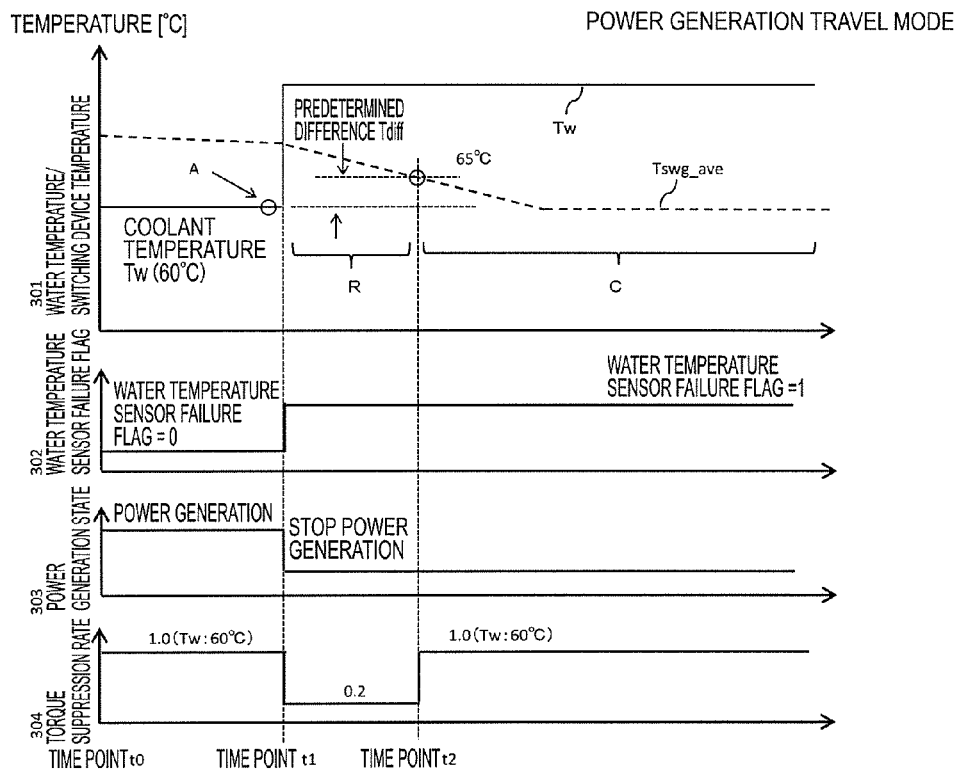

CONTROL DEVICE AND CONTROL METHOD FOR ELECTRICALLY DRIVEN VEHICLE

BACKGROUND OF THE INVENTION

1. Field of the Invention

The present invention relates to a control device and a control method for an electrically driven vehicle including an electric vehicle (EV) and a hybrid electric vehicle (HEV), and more particularly, to a failure of a coolant temperature sensor.

2. Description of the Related Art

In recent years, hybrid vehicles and electric vehicles are attracting attention as vehicles intended for energy saving and environmental friendliness. The hybrid vehicle has a motor as its power source in addition to a related-art engine, and the electric vehicle has a motor as its power source.

Both the hybrid vehicle and the electric vehicle are configured to use an inverter circuit to invert DC power stored in a battery to AC power to drive a motor and travel.

The inverter circuit is constructed by switching devices such as insulated gate bipolar transistors (IGBTs) or field effect transistors (FETs), and applies on/off control to the switching devices, thereby inverting the DC power to the AC power.

On this occasion, a current flows when the switching device is turned on, and as a result, the temperature of the switching device increases. Therefore, a temperature sensor configured to measure switching device temperature is provided to limit the current flowing through the switching device so that the switching device temperature does not exceed a limit and the switching device is protected from breakage.

As an example of the above-mentioned configuration, according to Japanese Patent Application Laid-open No. Hei 10-210790, an inverter electronic control unit (ECU) is configured to control an inverter to drive a motor, and detect an inverter temperature based on input from an inverter temperature sensor. Then, when the inverter temperature drastically increases, the inverter ECU adjusts a torque command value directed to the inverter, that is, suppresses an output torque of the motor to decrease a heat generation amount of the switching devices, thereby protecting the switching devices.

However, the technology described in Japanese Patent Application Laid-open No. Hei 10-210790 does not consider a case where a coolant temperature sensor has failed. Thus, in a case where the coolant temperature sensor has failed, and as a result, the actual coolant temperature becomes unknown, there occurs no problem when a cooling system is normal, while when the cooling system is brought into an abnormal state by leakage of the coolant or a failure of a water pump, the coolant temperature abnormally increases, and the generated heat of the switching devices is difficult to be absorbed by the coolant. As a result, the output torque suppression for the motor that is set assuming that the cooling system is normal, that is, the coolant temperature is normal, may not protect the switching devices from breakage.

Moreover, a method involving immediately stopping the motor drive when the failure of the coolant temperature sensor is detected so as to protect the switching device is conceivable, but this method has such a problem that the vehicle may become unable to travel in vain when the cooling system is not abnormal.

SUMMARY OF THE INVENTION

The present invention has been made in view of the above-mentioned problem, and therefore has an object to provide a control device and a control method for an electrically driven vehicle capable of reliably protecting switching devices in inverters from the overheating, and enabling continuous travel of the vehicle even when a coolant temperature sensor has failed.

According to one embodiment of the present invention, there are provided a control device and the like for an electrically driven vehicle, including: a power drive unit including a motor inverter and a generator inverter, the power drive unit being configured to invert power from a battery to drive a motor, and to invert power from a generator to store the inverted power in the battery; an inverter cooling device configured to cool each of the motor inverter and the generator inverter by coolant; a group of sensors installed on the electrically driven vehicle, and including a switching device temperature sensor configured to detect a temperature of a switching device of each of the motor inverter and the generator inverter and a coolant temperature sensor configured to detect a temperature of the coolant; and a control unit configured to control the electrically driven vehicle, in which: the control unit includes an electrically driven vehicle control part configured to switch between an EV travel mode and a power generation travel mode in accordance with detection values from the group of sensors, to thereby control the electrically driven vehicle; and the electrically driven vehicle control part includes: a coolant temperature sensor failure detection part configured to detect a failure of the coolant temperature sensor in accordance with a detection value from the coolant temperature sensor; and a coolant temperature sensor failure detection value replacement part configured to, in the EV travel mode, set a detection value detected by the switching device temperature sensor for the switching device of the generator inverter as a detection value of the temperature of the coolant when the failure of the coolant temperature sensor is detected.

According to the present invention, it is possible to provide the control device and the control method for an electrically driven vehicle capable of reliably protecting the switching devices in the inverters from the overheating, and enabling the continuous travel of the vehicle even when the coolant temperature sensor has failed.

BRIEF DESCRIPTION OF THE DRAWINGS

FIG. 6 is a timing chart for showing a vehicle operation when a coolant temperature sensor has failed in an EV mode of the control device for the electrically driven vehicle according to the embodiment of the present invention.

FIG. 7 is a timing chart for showing a vehicle operation when the coolant temperature sensor has failed in a power generation travel mode of the control device for the electrically driven vehicle according to the embodiment of the present invention.

DESCRIPTION OF THE EMBODIMENTS

Figure 1:
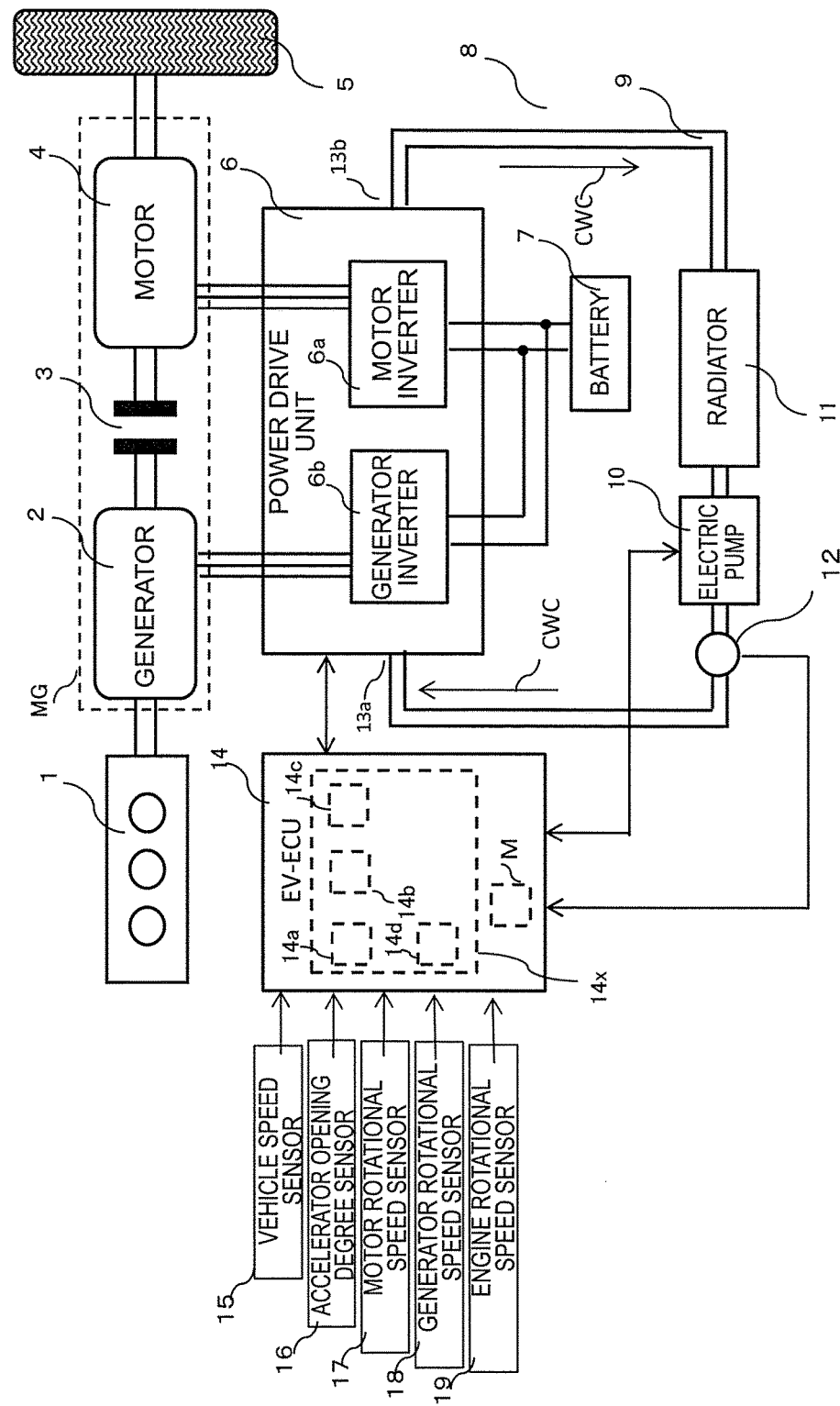
FIG. 1 is a schematic configuration diagram for illustrating a control device for an electrically driven vehicle according to an embodiment of the present invention.

In a control device and a control method for an electrically driven vehicle according to the present invention, motor drive is continued while protecting switching devices inside inverters even when a coolant temperature sensor configured to detect a coolant temperature has failed.

According to the control method and the control device for an electrically driven vehicle according to the present invention, there are provided switching device temperature sensors configured to detect the temperatures of switching devices for inverters, a coolant temperature sensor configured to detect the temperature of coolant, and a coolant temperature sensor failure detection part configured to detect a failure of the coolant temperature sensor. In an electric vehicle (EV) travel mode, a switching device temperature detection value detected by the switching device temperature sensor for a generator inverter is recognized and replaced as the coolant temperature when the failure of the coolant temperature sensor is detected by the coolant temperature sensor failure detection part. With this, the correct coolant temperature can be recognized even when the coolant temperature sensor has failed, and the switching devices of a motor inverter can be protected from overheating while continuing vehicle driving.

According to the control method and the control device for an electrically driven vehicle according to the present invention, there is further provided a motor maximum output torque suppression part configured to suppress the maximum output torque of the motor in accordance with the coolant temperature. In a power generation travel mode, in a case where the failure of the coolant temperature sensor is detected by the coolant temperature sensor failure detection part, drive of a generator is stopped, and when a difference between the coolant temperature detection value before the failure of the coolant temperature sensor is detected by the coolant temperature sensor failure detection part and a switching device temperature detection value detected by the switching device temperature sensor for the generator inverter is more than a predetermined value, the maximum output torque is suppressed by the motor maximum output torque suppression part, while when the difference is equal to or less than the predetermined value, the switching device temperature detection value detected by the switching device temperature sensor for the generation inverter is recognized as the coolant temperature. Thus, even when the coolant temperature sensor has failed, the switching devices of the motor inverter are protected by suppressing the motor maximum output torque in accordance with a motor maximum output torque suppression map assuming a case where the coolant temperature is the maximum water temperature, for example, 110° C. until the correct coolant temperature comes to be detected again, and the vehicle driving can be continued without the torque suppression after the correct coolant temperature comes to be detected again. Therefore, the switching devices can be protected from the overheating while a sense of discomfort, e.g., a decrease in a torque, felt by the driver is minimized.

Now, a control device and a control method for an electrically driven vehicle according to embodiments of the present invention are described with reference to the drawings. In each of the drawings, the same or corresponding portions are denoted by the same reference symbols.

First Embodiment

FIG. 1 is a schematic configuration diagram for illustrating a control device for an electrically driven vehicle according to an embodiment of the present invention. In FIG. 1, between a battery 7 serving as a power supply and a motor 4, and between the battery 7 and a generator 2, a power drive unit (PDU) 6 configured to invert a DC voltage of the battery 7 to an AC voltage is provided. The PDU 6 includes a motor inverter 6a and a generator inverter 6b capable of inverting the DC voltage of the battery 7 to AC voltages for supply to the motor 4 and the generator 2, respectively.

In an EV travel mode, the engine 1 is stopped and the generator 2 is not generating power, and thus the motor inverter 6a inverts DC power stored in the battery 7 to three-phase AC power for supply to the motor 4, thereby driving the motor 4 and then tires 5 to cause the vehicle to travel.

Moreover, the motor 4 is rotated by the tires 5 during deceleration of the vehicle or the like, and the motor 4 carries out regenerative power generation. The power generated on this occasion is used to charge the battery 7 via the motor inverter 6a.

In the power generation travel mode, the engine 1 is driven and the generator 2 is generating the power, and thus the generated power is used to charge the battery 7 via the generator inverter 6b.

Then, the motor inverter 6a inverts the power generated by the generator 2 or the DC power stored in the battery 7 to the AC power for supply to the motor 4, thereby driving the motor 4 and then the tires 5 to cause the vehicle to travel.

Moreover, the motor 4 is rotated by the tires 5 during deceleration of the vehicle or the like, and the motor 4 carries out the regenerative power generation. The power generated by the regenerative power generation is used to charge the battery 7 via the motor inverter 6a.

Moreover, the generator inverter 6b is also configured to invert the DC power stored in the battery 7 to the AC power for driving the generator 2 and also starting the engine 1.

Moreover, the vehicle can be caused to travel by engaging the clutch 3 to transmit the driving force of the engine 1 to the tires 5 via the motor 4.

In the following, a description is given of a series type hybrid vehicle as illustrated in FIG. 1 as an example, but the vehicle may be a parallel type hybrid vehicle.

The series type is a type of using the engine only for the power generation, and using the motor only both for the driving of axles and the regeneration. The parallel type is a type of using a plurality of installed power sources, i.e., the engine and the motor, for the driving of the axles. In FIG. 1, the configuration is the series type under a state where the clutch 3 is released, and is the parallel type under a state where the clutch 3 is engaged.

Moreover, the generator 2 and the motor 4 may be a motor/generator MG for carrying out both the driving and the power generation as described above.

Moreover, a DC/DC converter (not shown) for carrying out voltage conversion and the like may be provided between the battery 7 and the inverters 6a and 6b.

Figure 2:
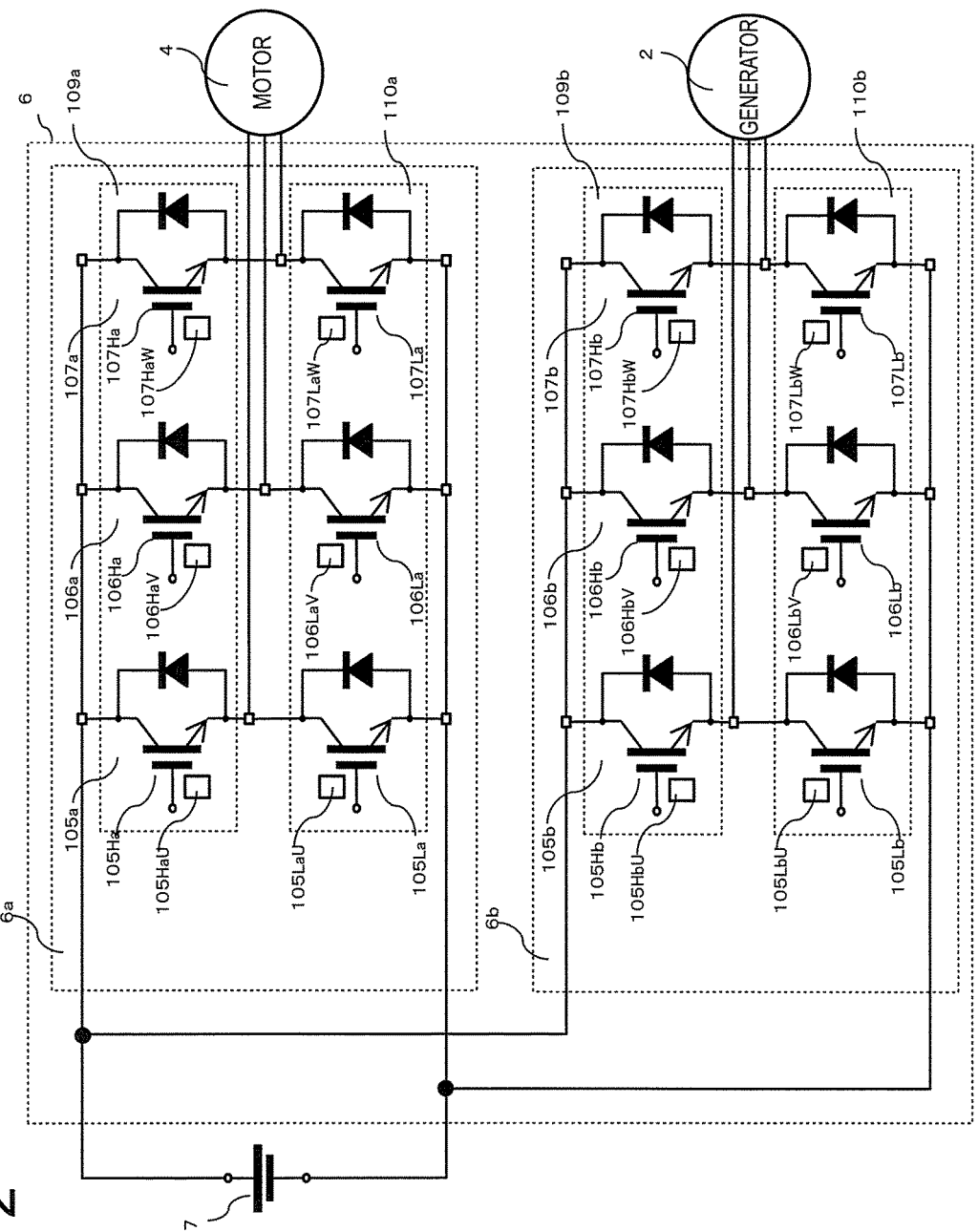
FIG. 2 is a schematic circuit configuration diagram for illustrating an electric circuit part of a PDU of FIG. 1.

FIG. 2 is a schematic circuit configuration diagram for illustrating an electric circuit part of the PDU 6. The PDU 6 is constructed by the motor 4, the generator 2, the battery 7, the motor inverter 6a configured to invert the DC power stored in the battery 7 to the AC power and control the drive of the motor 4, and the generator inverter 6b configured to invert the AC power generated by the generator 2 to the DC power and store the DC power in the battery 7.

The motor inverter 6a includes a U phase switching circuit 105a, a V phase switching circuit 106a, and a W phase switching circuit 107a.

The U phase switching circuit 105a includes an upper arm side switching circuit 105Ha on an upper arm 109a side and a lower arm side switching circuit 105La on a lower arm 110a side.

The V phase switching circuit 106a includes an upper arm side switching circuit 106Ha on the upper arm 109a side and a lower arm side switching circuit 106La on the lower arm 110a side.

The W phase switching circuit 107a includes an upper arm side switching circuit 107Ha on the upper arm 109a side and a lower arm side switching circuit 107La on the lower arm 110a side.

Moreover, the switching circuits 105Ha to 107Ha and 105La to 107La are constructed by switching devices, e.g., IGBTs or FETs, and freewheeling diodes, and are controlled by an EV-ECU 14 described later.

In the example of FIG. 2, switching device temperature sensors 105HaU, 106HaV, and 107HaW configured to measure switching device temperatures of the switching circuits 105Ha to 107Ha are provided on the upper arm 109a side. Switching device temperature sensors 105LaU, 106LaV, and 107LaW configured to measure switching device temperatures of the switching circuits 105La to 107La are provided on the lower arm 110a side. The EV-ECU 14 is configured to acquire the switching device temperatures of the respective switching circuits, and limit currents, namely, the output torque so as not to exceed a limit temperature, thereby protecting the switching devices from breakage.

The motor inverter 6b includes a U phase switching circuit 105b, a V phase switching circuit 106b, and a W phase switching circuit 107b.

The U phase switching circuit 105b includes an upper arm side switching circuit 105Hb on an upper arm 109b side and a lower arm side switching circuit 105Lb on a lower arm 110b side.

The V phase switching circuit 106b includes an upper arm side switching circuit 106Hb on the upper arm 109b side and a lower arm side switching circuit 106Lb on the lower arm 110b side.

The W phase switching circuit 107b includes an upper arm side switching circuit 107Hb on the upper arm 109b side and a lower arm side switching circuit 107Lb on the lower arm 110b side.

Moreover, the switching circuits 105Hb to 107Hb and 105Lb to 107Lb are constructed by switching devices, e.g., IGBTs or FETs, and freewheeling diodes, and are controlled by the EV-ECU 14 described later.

In the example of FIG. 2, switching device temperature sensors 105HbU, 106HbV, and 107HbW configured to measure switching device temperatures of the switching circuits 105Hb to 107Hb are provided on the upper arm 109b side. Switching device temperature sensors 105LbU, 106LbV, and 107LbW configured to measure switching device temperatures of the switching circuits 105Lb to 107Lb are provided on the lower arm 110b side. The EV-ECU 14 is configured to acquire the switching device temperatures of the respective switching circuits, and limit currents, namely, the output torque so as not to exceed a limit temperature, thereby protecting the switching devices from breakage.

Returning to FIG. 1, the vehicle includes an inverter cooling device 8 for radiating, to the outside, heat generated by the operations of the switching circuits 105Ha to 107Ha and 105La to 107La of the motor inverter 6a and the switching circuits 105Hb to 107Hb and 105Lb to 107Lb of the generator inverter 6b.

The inverter cooling device 8 includes a coolant pipe 9 through which coolant for cooling the PDU 6 including the switching circuits, an electric water pump 10 configured to circulate the coolant through the coolant pipe 9, a radiator 11 configured to carry out heat exchange between the coolant and outside air for cooling, and a coolant temperature sensor 12 configured to detect the temperature of the coolant.

Figure 3:
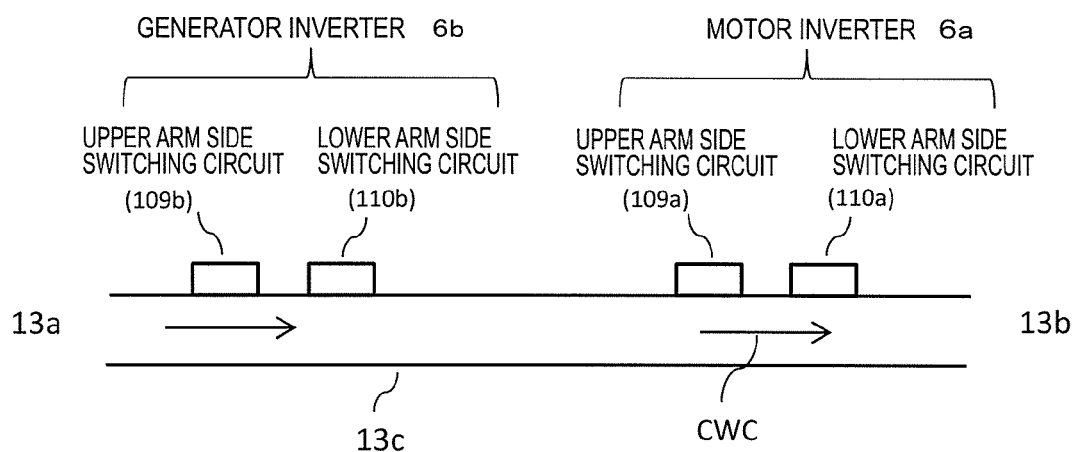
FIG. 3 is a partially enlarged view for illustrating a schematic structure of a water jacket in the PDU of FIG. 1.

Both ends of the coolant pipe 9 are connected to the PDU 6, and the coolant pressurized and fed out from the electric water pump 10 enters from an inlet part 13a, and is discharged from an outlet part 13b to the radiator 11. Moreover, a water jacket 13c through which the coolant flows as represented by the arrows CWC of FIG. 3 is arranged between the inlet part 13a and the outlet part 13b inside the PDU 6b including the motor inverter 6a and the generator inverter 6b.

The respective switching circuits of the upper arm 109a and the lower arm 110a of the motor inverter 6a and the upper arm 109b and the lower arm 110b of the generator inverter 6b are arranged on the water jacket 13c for securing a sufficient heat radiation property. As a result, the generated heat of the switching devices (not shown) in the switching circuits is absorbed by the coolant through the water jacket 13c. The coolant that has absorbed the heat of the switching devices releases the heat to the outside on the radiator 11. As a result, the respective switching circuits can be protected from the overheating.

Further, the vehicle includes the electronic control unit (EV-ECU) 14, which is a control unit configured to control the vehicle in an integrated manner, and detection signals representing detection values are input to the EV-ECU 14 from:

a vehicle speed sensor 15 configured to detect the vehicle speed;

an accelerator opening degree sensor 16 configured to detect an accelerator operation amount;

a motor rotational speed sensor 17 configured to detect a rotational speed of the motor 4;

a generator rotational speed sensor 18 configured to detect a rotational speed of the generator 2;

an engine rotational speed sensor 19 configured to detect a rotational speed of the engine 1;

the coolant temperature sensor 12 configured to detect the temperature of coolant;

a group of switching device temperature sensors (105HaU, 106HaV, 107HaW, 105LaU, 106LaV, and 107Law, and 105HbU, 106HbV, 107HbW, 105LbU, 106LbV, and 107LbW) configured to detect the temperatures of the switching devices provided for the PDU 6; and sensors required for various types of control, which are not shown.

The EV-ECU 14 is configured to control the motor inverter 6a, the generator inverter 6b, the engine 1, the motor 4, the generator 2, the clutch 3, and the electric pump 10 based on the detection values input from the respective sensors as illustrated in FIG. 1.

Moreover, the EV-ECU 14 serving as a control unit includes an electrically driven vehicle control part 14x configured to switch the travel mode between the EV travel mode and the power generation travel mode in accordance with the detection values from the group of sensors (105HaU to 107LbW, 12, and 15 to 19) described above, thereby controlling the vehicle, and includes a storage part M.

The electrically driven vehicle control part 14x includes:

a coolant temperature sensor failure detection part 14a configured to detect the failure of the coolant temperature sensor 12;

a travel mode determination part 14b configured to set the travel mode in accordance with the detection values from the group of sensors (105HaU to 107LbW, 12, and 15 to 19);

a motor maximum output torque suppression part 14c configured to suppress the maximum output torque of the motor in accordance with the coolant temperature detected by the coolant temperature sensor 12; and a coolant temperature sensor failure detection value replacement part 14d configured to replace the detection value upon the coolant temperature sensor failure.

On this occasion, when the coolant temperature sensor 12 normally detects the coolant temperature Tw, the currents flowing through the switching devices are adjusted to perform control such that the maximum output torque is suppressed in accordance with the coolant temperature. As a result, the motor 4 can be driven so that the temperatures of the switching devices do not exceed the limit temperature.

Figure 4:
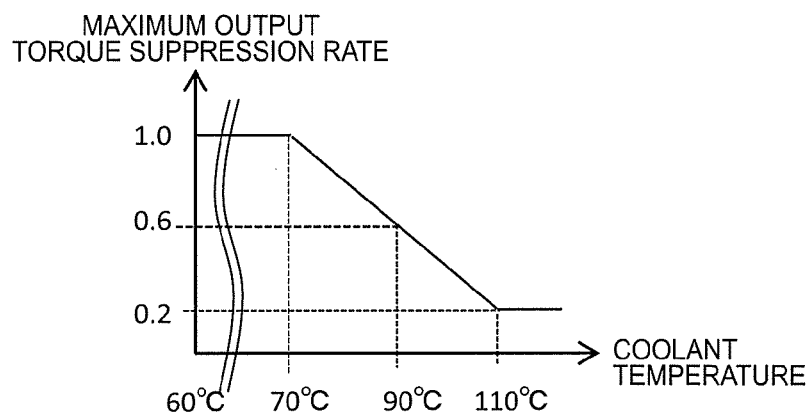
FIG. 4 is a graph for showing an example of a motor maximum output torque suppression map to be used for the control device for the electrically driven vehicle according to the embodiment of the present invention.

As shown in a motor maximum output torque suppression map of FIG. 4, a map where the coolant temperature is assigned to a horizontal axis, and a maximum output torque suppression rate is assigned to a vertical axis is used to suppress the maximum output torque. For example, the suppression rate of the maximum output torque is 1.0 (not suppressed) until the coolant temperature increases to 70° C., the suppression rate is 0.6 when the coolant temperature is 90° C., and the suppression rate is 0.2 when the coolant temperature is 110° C. As a result of the suppression of the maximum output torque, the motor 4 can be controlled while the switching devices are protected from the overheating. Moreover, as the coolant temperature increases, a heat quantity that can be radiated from the switching devices to the coolant decreases, and the suppression rate thus decreases.

The motor maximum output torque suppression map for protecting the switching devices from the overheating depends on the coolant temperature in this way, and it is thus important to detect a correct coolant temperature.

However, when the coolant temperature sensor 12 fails, a difference between the actual temperature of the coolant and the coolant temperature sensor detection value increases. When the output torque is suppressed in accordance with the motor maximum output torque suppression map shown in FIG. 4, the switching devices may not be protected from the overheating.

Moreover, when the coolant temperature sensor 12 fails and the motor 4 and the generator 2 are simply stopped, the vehicle no longer travels.

According to this embodiment, when the coolant temperature sensor has failed, the EV-ECU 14 carries out the following control for the electrically driven vehicle depending on the travel state, that is, the EV travel mode and the power generation travel mode.

Figure 8:
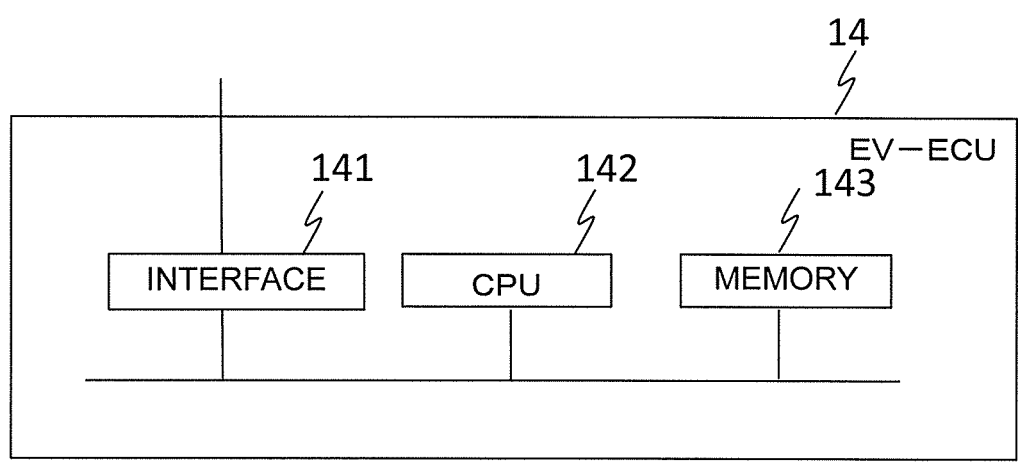
FIG. 8 is a diagram for illustrating an example of a schematic hardware configuration when an EV-ECU of FIG. 1 is constructed by a computer.

FIG. 8 is a diagram for illustrating an example of a schematic hardware configuration of the EV-ECU 14 constructed, for example, by a computer. Signals are input/output via an interface 141. Programs for various functions represented by functional blocks in the EV-ECU 14 of FIG. 1, and information data, tables, maps, and the like required for the processing including the motor maximum output torque suppression map of FIG. 4 are stored in advance in the memory 143. The storage part M in the EV-ECU 14 of FIG. 1 corresponds to the memory 143. The CPU 142 is configured to carry out calculation processing for the signals input via the interface 141 in accordance with the various programs, the information data, the tables, and the maps stored in the memory 143, and output processing results via the interface 141.

Figure 5:
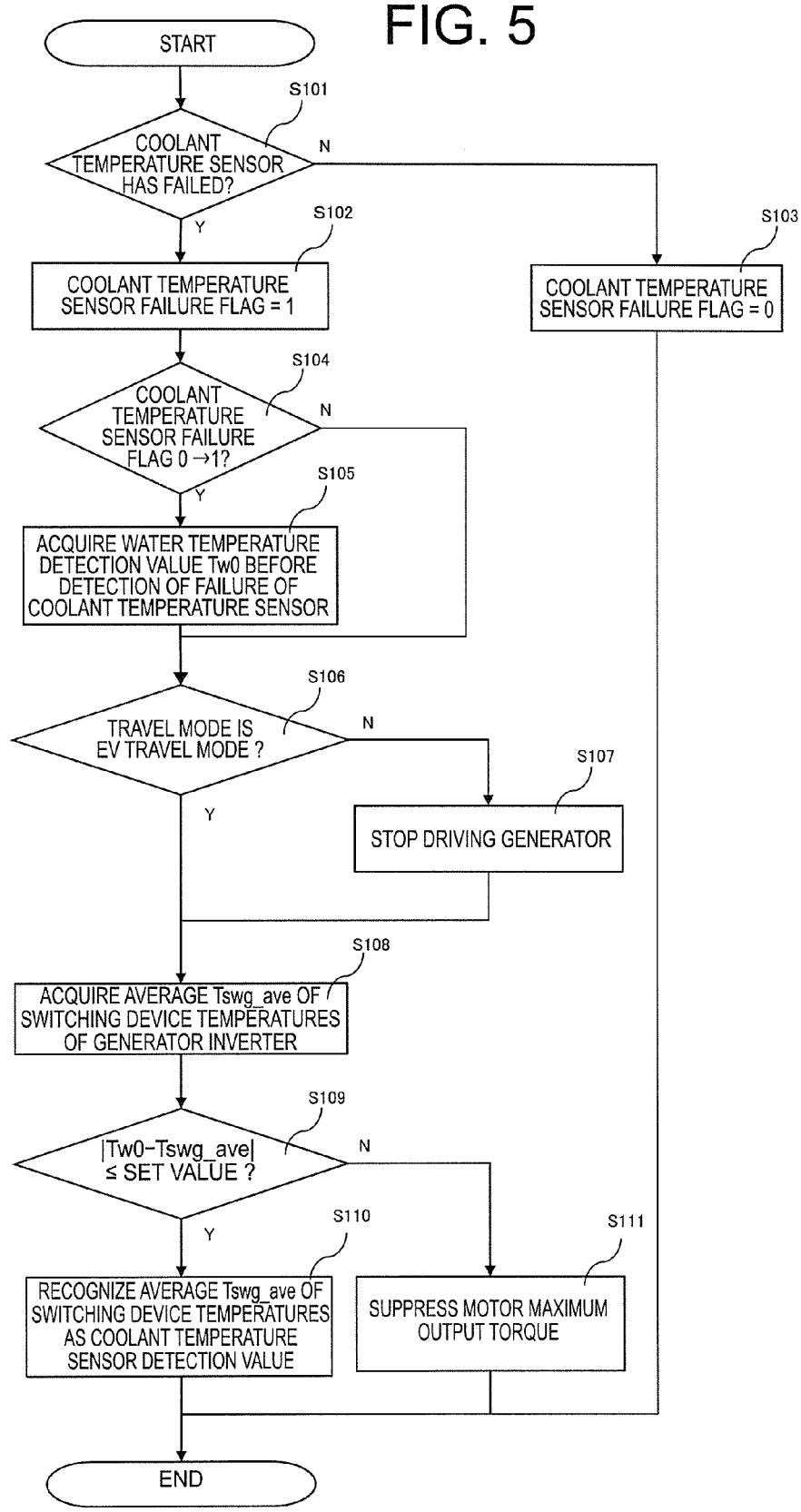
FIG. 5 is an operation flowchart for illustrating an example of control for the electrically driven vehicle when a water temperature sensor for the control device for the electrically driven vehicle fails according to the embodiment of the present invention.

FIG. 5 is an operation flowchart for illustrating an example of control for the electrically driven vehicle when a water temperature sensor for the control device for the electrically driven vehicle fails according to the embodiment of the present invention. This operation flowchart is repeated at a set cycle.

In the EV-ECU 14, the electrically driven vehicle control part 14x is configured to switch between the EV travel mode and the power generation travel mode in accordance with the detection values from the group of sensors (105HaU to 107LbW, 12, and 15 to 19), thereby controlling the vehicle. The switching between the EV travel mode and the power generation travel mode is carried out by the travel mode determination part 14b.

Then, in Step S101, the coolant temperature sensor failure detection part 14a determines whether or not the coolant temperature sensor 12 has failed. On this occasion, when the output voltage of the coolant temperature sensor 12 falls outside a predetermined set range, the coolant temperature sensor 12 is determined to have failed. On this occasion, the set range can be set in advance considering the output voltages when the coolant temperature sensor 12 is open-circuited or short-circuited. In Step S101, when the coolant temperature sensor 12 is determined to have failed, the control proceeds to Step S102, or otherwise proceeds to Step S103.

In Step S102, the coolant temperature sensor failure detection part 14a sets a coolant temperature sensor failure flag to "1", and proceeds to Step S104. In Step S103, the coolant temperature sensor failure flag is reset to "0".

In Step S104, the coolant temperature sensor failure detection part 14a detects whether or not the coolant temperature sensor failure flag has changed from "0" to "1", proceeds to Step S105 when the change from "0" to "1" is detected, or proceeds to Step S106 otherwise.

In Step S105, the coolant temperature sensor failure detection part 14a acquires a water temperature detection value Tw0 before the detection of the failure of the coolant temperature sensor 12. Specifically, the detection value of the coolant temperature sensor 12 is periodically (e.g., at an interval of 100 milliseconds) stored in the storage part M as time series data. The coolant temperature sensor failure detection part 14a reads, from the storage part M, the value before the water temperature sensor failure flag has changed from "0" to "1" and the failure of the coolant temperature sensor 12 is detected, and sets the value as the water temperature detection value Tw0 before the coolant temperature sensor failure detection.

In Step S106, the travel mode determination part 14b determines whether the travel mode currently set based on the vehicle speed detected by the vehicle speed sensor 15 and the accelerator opening degree detected by the accelerator opening degree sensor 16 is the EV travel mode or the power generation travel mode. When the travel mode is determined to be the EV travel mode, the control proceeds to Step S108. When the travel mode is determined to be the power generation travel mode, the control proceeds to Step S107, and the electrically driven vehicle control part 14*x* stops the drive of the generator, and maintains this state. As a result, the electricity is not supplied to the generator inverter 6*b*, and the switching circuits 105Hb to 107Hb and 105Lb to 107Lb no longer generate heat.

In Step S108, the motor maximum output torque suppression part 14*c* acquires an average Tswg_ave of the switching device temperatures detected by the switching device temperature sensors 105HbU, 106HbV, 107HbW, 105LbU, 106LbV, and 107LbW of the generator inverter 6*b*, and proceeds to Step S109.

In Step S109, the motor maximum output torque suppression part 14*c* determines whether or not the absolute value of a difference between the water temperature detection value Tw0 of the coolant before the coolant temperature sensor failure detection, which is acquired in Step S105, and the average Tswg_ave of the switching device temperatures of the generator inverter 6*b*, which is acquired in Step S108, is equal to or less than a set difference Tdiff set in advance, that is, whether or not |Tw0−Tswg_ave|≤Tdiff. When the difference is equal to or less than the set difference Tdiff, the motor maximum output torque suppression part 14*c* determines that the actual coolant temperature and the average Tswg_ave of the switching device temperatures of the generator inverter 6*b* approximately match each other, and proceeds to Step S110. In Step S110, the coolant temperature sensor failure detection value replacement part 14*d* recognizes the coolant temperature Tw as the average Tswg_ave of the switching device temperatures of the generator inverter 6*b*, sets the coolant temperature Tw to the average value Tswg_ave, and finishes this routine.

As a result, the electrically driven vehicle control part 14*x* uses not the value acquired by the coolant temperature sensor 12, but the average value Tswg_ave of the switching device temperatures as the coolant temperature Tw to control the motor 4.

Moreover, when the difference between the water temperature detection value Tw0 before the coolant temperature sensor failure detection, which is acquired in Step S105, and the average Tswg_ave of the switching device temperatures of the generator inverter 6*b*, which is acquired in Step S108, is more than the set difference Tdiff, the motor maximum output torque suppression part 14*c* determines that the actual coolant temperature and the average Tswg_ave of the switching device temperatures of the generator inverter 6*b* are different from each other, and proceeds to Step S111.

In Step S111, the actual coolant temperature is unknown, and the motor maximum output torque suppression part 14*c* thus assumes that the coolant temperature is the maximum temperature (e.g., 110° C.), and suppresses the maximum output torque of the motor. Specifically, when the coolant temperature is 110° C., the maximum output torque suppression rate is 0.2 as shown in FIG. 4.

Even when the actual coolant temperature is unknown, the state where the coolant temperature is very high and the effectiveness of the cooling for the switching devices is worst is assumed to suppress the motor maximum output torque. Thus, it is possible to continue the travel of the vehicle by driving the motor while protecting the switching devices from overheating.

Moreover, the motor maximum output torque suppression rate can be acquired by a real machine test, the motor output torque that does not cause an excess of a heat resistant limit temperature (e.g., 150° C.) of the switching devices is derived at each of the coolant temperatures (60° C., 70° C., 90° C., and 110° C.), and the motor maximum output torque suppression map of FIG. 4 can be set based on this result to be stored in the storage part M and used.

FIG. 6 and FIG. 7 are time charts for showing an operation of this embodiment.

FIG. 6 is a time chart for showing an operation when the coolant temperature sensor 12 fails in the EV travel mode and the average Tswg_ave of the switching device temperatures of the generator inverter 6*b* is recognized as the coolant temperature to continue the drive of the motor.

On a row 201, the solid line represents the coolant temperature Tw, and the broken line represents the average Tswg_ave of the switching device temperatures of the generator inverter 6*b*. In this time chart, the actual coolant temperature (not shown) is constant at 60° C. A symbol C denotes a period in which the coolant temperature Tw is replaced by the average Tswg_ave of the switching device temperatures of the generator inverter 6*b*.

On a row 202, the water temperature sensor failure flag relating to Steps S102 to S104 of FIG. 5 is shown, and is set to "1" when the failure of the coolant temperature sensor or the water temperature sensor is detected.

On a row 203, the drive state of the generator 2 is shown, and the power generation is always stopped in the EV travel mode.

On a row 204, the maximum output torque suppression rate of the motor 4 is shown, and the suppression rate is set in accordance with the coolant temperature from the motor maximum output torque suppression map of FIG. 4.

A description is now given of an operation of FIG. 6. The travel mode from a time point t0 to a time point t1 is the EV travel mode in which the motor inverter 6*a* inverts the DC power stored in the battery 7 to the three-phase AC power, and supplies the AC power to the motor 4, thereby driving the motor 4. In the EV travel mode, the generator 2 is stopped, the switching devices of the generator inverter 6*b* do not generate heat, and the switching device temperatures of the generator inverter 6*b* match the coolant temperature.

When the failure of the coolant temperature sensor 12 is detected at the time point t1, the coolant temperature sensor failure flag is set to "1", and the power generation of the generator 2 continues to be stopped. Then, the average (60° C.) of the switching device temperatures of the generator inverter 6*b* is recognized as the coolant temperature, and the motor drive is continued.

Moreover, the motor maximum output torque suppression rate is set to 1.0, that is, the suppression is not carried out in accordance with the torque suppression rate in the case where the coolant temperature is 60° C. illustrated in the motor maximum output torque suppression map of FIG. 4. Even when the coolant temperature sensor 12 fails, the correct coolant temperature can be detected in this way, and the switching devices of the inverter can be protected from the overheating while the vehicle driving is continued.

FIG. 7 is a timing chart for showing an operation when the coolant temperature sensor 12 fails in the power generation travel mode, the driving of the generator 2 is stopped, the motor maximum output torque is suppressed, the average Tswg_ave of the switching device temperatures of the generator inverter 6*b* is recognized as the coolant temperature Tw after the temperatures of the switching devices of the generator inverter 6*b* decrease, and the motor drive is continued. After the coolant temperature Tw is replaced, the suppression rate returns to 1.0.

On a row 301, the solid line represents the coolant temperature Tw, and the broken line represents the average Tswg_ave of the switching device temperatures of the generator inverter 6b. In this time chart, the actual coolant temperature (not shown) is constant at 60° C. A symbol C denotes a period in which the coolant temperature Tw is replaced by the average Tswg_ave of the switching device temperatures of the generator inverter 6b. A symbol R denotes a period in which the motor maximum output torque is suppressed.

On a row 302, the water temperature sensor failure flag relating to Steps S102 to S104 of FIG. 5 is shown, and is set to "1" when the failure of the coolant temperature sensor or the water temperature sensor is detected.

On a row 303, the drive state of the generator 2 is shown, the generator 2 is generating the power, and the generated power is supplied to the motor 4 and the battery 7 in the power generation travel mode.

On a row 304, the maximum output torque suppression rate of the motor 4 is shown, and the suppression rate is set in accordance with the coolant temperature Tw from the motor maximum output torque suppression map of FIG. 4.

A description is now given of an operation of FIG. 7. From a time point t0 to a time point t1, the travel mode is the power generation travel mode in which the power generated by the generator 2 using the driving force of the engine 1 or the DC power stored in the battery 7 is inverted by the motor inverter 6a to the AC power, thereby driving the motor 4. The generator 2 is generating the power, the switching devices of the generator inverter 6b generate heat, and the switching device temperature of the generator inverter 6b is different from the coolant temperature Tw in this period.

At the time point t1, when the failure of the coolant temperature sensor 12 is detected, the coolant temperature sensor failure flag is set to "1", and the power generation of the generator 2 is stopped. On this occasion, the motor maximum output torque suppression rate is set to 0.2 in accordance with the torque suppression rate for the maximum coolant temperature in the motor maximum output torque suppression map of FIG. 4, namely, 110° C. in the motor maximum output torque suppression map of FIG. 4, and the motor drive is continued. For example, when the maximum output torque of the motor 4 is 100 Nm, the motor drive is continued while an upper limit torque is limited to 20 Nm.

After the time point t1, the generator 2 is stopped, the switching devices of the generator inverter 6b do not generate heat, and the switching device temperatures (average Tswg_ave) of the generator inverter 6b gradually decrease.

Then, at a time point t2, the difference between the average Tswg_ave of the switching device temperatures of the generator inverter 6b and the coolant temperature (60° C.) before the failure of the coolant temperature sensor 12 indicated by A becomes equal to or less than the set difference Tdiff (e.g., 5° C.), that is, the average Tswg_ave becomes equal to or less than 65° C., the average Tswg_ave of the switching device temperatures of the generator inverter 6b is determined to match the coolant temperature Tw, and the average Tswg_ave of the detection values of the switching device temperatures of the generator inverter 6b is recognized as the coolant temperature Tw. As a result, the coolant temperature is set to the average Tswg_ave of the switching device temperatures of the generator inverter 6b in accordance with the motor maximum output torque suppression map of FIG. 4, and the motor drive is continued at the motor maximum output torque suppression rate 1.0 corresponding thereto.

In this way, even when the coolant temperature sensor 12 fails, the maximum output torque is suppressed in accordance with the motor maximum output torque suppression map assuming that the coolant temperature is the maximum water temperature (110° C.) until the correct coolant temperature can be detected again, and the vehicle driving by the motor is continued without suppressing the maximum output torque after the correct coolant temperature can be detected again. Therefore, it is possible to protect the switching devices of the inverter from the overheating while a sense of discomfort, e.g., the decrease in the torque, felt by the driver is minimized.

According to the embodiment, the plurality of switching device temperature sensors are provided for each of the motor inverter 6a and the generator inverter 6b, and the average Tswg_ave of the detection values of the plurality of switching device temperature sensors is acquired, but when one switching device temperature sensor is provided for each of the motor inverter 6a and the generator inverter 6b, the detection value of the switching device temperature sensor only needs to be used.

What is claimed is:

1. A control device for an electrically driven vehicle, the control device comprising:
   a power drive unit comprising a motor inverter and a generator inverter, the power drive unit being configured to invert power from a battery to drive a motor, and to invert power from a generator to store the inverted power in the battery;
   an inverter cooling device configured to cool the motor inverter and the generator inverter by coolant;
   a group of sensors installed on the electrically driven vehicle, and comprising a switching device temperature sensor configured to detect a temperature of a switching device of each of the motor inverter and the generator inverter and a coolant temperature sensor configured to detect a temperature of the coolant; and
   a control unit configured to switch between an electric vehicle (EV) travel mode and a power generation travel mode in accordance with detection values from the group of sensors, to thereby control the electrically driven vehicle, and detect a failure of the coolant temperature sensor in accordance with a coolant temperature detection value detected by the coolant temperature sensor,
   wherein the control unit is further configured to, in response to detecting the failure of the coolant temperature sensor and the electrically driven vehicle being in the EV travel mode, compare a previous coolant temperature detection value, which has been detected before the detection of the failure, with a switching device temperature detection value detected by the switching device temperature sensor for the switching device of the generator inverter, suppress a maximum output torque of the motor when a difference between the previous coolant temperature detection value and the switching device temperature detection value is more than a set value, and set the switching device temperature detection value as the coolant temperature detection value when the difference between the previous coolant temperature detection value and the switching device temperature detection value is equal to or less than the set value and control the motor without suppressing the maximum output torque.

2. The control device for the electrically driven vehicle according to claim 1, wherein the control unit
is further configured to stop driving the generator inverter when the failure of the coolant temperature sensor is detected in the power generation travel mode.

3. The control device for the electrically driven vehicle according to claim 1, wherein:
the switching device temperature sensor comprises a plurality of switching device temperature sensors provided for each of the motor inverter and the generator inverter; and
an average of the detection values detected by the plurality of switching device temperature sensors of the generator inverter is set as the switching device temperature detection value detected by the switching device temperature sensor for the switching device of the generator inverter.

4. The control device for the electrically driven vehicle according to claim 1, wherein the control unit is further configured to store coolant temperature detection values detected by the coolant temperature sensor chronologically in a memory.

5. A control method for an electrically driven vehicle, the control method comprising:
cooling by coolant a motor inverter and a generator inverter, which are included in a power drive unit configured to invert power from a battery to drive a motor, and to invert power from a generator to store the inverted power in the battery;
controlling the electrically driven vehicle by switching between an electric vehicle (EV) travel mode and a power generation travel mode in accordance with detection values from a group of sensors installed on the electrically driven vehicle and comprising a switching device temperature sensor configured to detect a temperature of a switching device of each of the motor inverter and the generator inverter and a coolant temperature sensor configured to detect a temperature of the coolant; and
detecting a failure of the coolant temperature sensor in accordance with a coolant temperature detection value detected by the coolant temperature sensor,
wherein the controlling further comprises:
in response to detecting the failure of the coolant temperature sensor and the electrically driven vehicle being in the EV travel mode, comparing a previous coolant temperature detection value, which has been detected before the detection of the failure, with a switching device temperature detection value detected by the switching device temperature sensor for the switching device of the generator inverter,
suppressing a maximum output torque of the motor when a difference between the previous coolant temperature detection value and the switching device temperature detection value is more than a set value, and
setting the switching device temperature detection value as the coolant temperature detection value when the difference between the previous coolant temperature detection value and the switching device temperature detection value is equal to or less than the set value and controlling the motor without suppressing the maximum output torque.

* * * * *